United States Patent [19]
Fergason

[11] Patent Number: 5,808,589
[45] Date of Patent: Sep. 15, 1998

[54] OPTICAL SYSTEM FOR A HEAD MOUNTED DISPLAY COMBINING HIGH AND LOW RESOLUTION IMAGES

[76] Inventor: James L. Fergason, 92 Adam Way, Atherton, Calif. 94025

[21] Appl. No.: 328,371

[22] Filed: Oct. 25, 1994

Related U.S. Application Data

[63] Continuation-in-part of Ser. No. 295,383, Aug. 24, 1994, Pat. No. 5,621,572.

[51] Int. Cl.⁶ .................................................. G02B 5/32
[52] U.S. Cl. .............................................. 345/8; 359/630
[58] Field of Search ............ 345/8–9, 87; 359/630–633, 359/629, 464, 466, 471–475, 530, 80; 273/358; 348/123; 250/574; 356/438

[56] References Cited

U.S. PATENT DOCUMENTS

| | | | |
|---|---|---|---|
| Re. 32,521 | 10/1987 | Fergason | 359/53 |
| 2,581,000 | 1/1952 | Copeland | 359/472 |
| 2,698,553 | 1/1955 | Copeland | 359/631 |
| 2,782,681 | 2/1957 | Copeland | 359/472 |
| 2,883,908 | 4/1959 | Copeland | 359/482 |
| 3,447,854 | 6/1969 | Minter | 359/471 |
| 3,620,592 | 11/1971 | Freeman | 359/727 |
| 3,767,291 | 10/1973 | Johnson | 359/800 |
| 3,772,507 | 11/1973 | Hills | 359/638 |
| 4,097,128 | 6/1978 | Matsumoto et al. | 359/53 |
| 4,114,990 | 9/1978 | Mash et al. | 359/93 |
| 4,239,346 | 12/1980 | Lloyd | 345/87 |
| 4,347,507 | 8/1982 | Spooner . | |
| 4,347,508 | 8/1982 | Spooner | 345/8 |
| 4,385,806 | 5/1983 | Fergason | 359/94 |
| 4,540,243 | 9/1985 | Fergason | 359/53 |
| 4,561,722 | 12/1985 | Smetana | 359/629 |
| 4,609,253 | 9/1986 | Perisic | 359/629 |
| 4,634,384 | 1/1987 | Neves et al. | 348/123 |
| 4,647,967 | 3/1987 | Kirschner et al. . | |
| 4,648,691 | 3/1987 | Oguchi et al. | 359/70 |
| 4,840,455 | 6/1989 | Kempf | 359/471 |
| 4,987,410 | 1/1991 | Berman et al. . | |
| 4,994,794 | 2/1991 | Price et al. | 345/7 |
| 4,997,263 | 3/1991 | Cohen et al. | 345/8 |
| 5,136,675 | 8/1992 | Hodson | 359/630 |
| 5,189,452 | 2/1993 | Hodson | 359/630 |
| 5,189,554 | 2/1993 | Vanasse et al. | 359/530 |
| 5,198,928 | 3/1993 | Chauvin | 359/630 |
| 5,210,624 | 5/1993 | Matsumoto et al. | 359/630 |
| 5,242,306 | 9/1993 | Fisher | 273/358 |
| 5,305,124 | 4/1994 | Chern et al. | 359/630 |
| 5,418,584 | 5/1995 | Larson | 359/629 |
| 5,487,665 | 1/1996 | Lechner et al. | 359/630 |
| 5,519,524 | 5/1996 | Fergason et al. | 359/80 |

FOREIGN PATENT DOCUMENTS

| | | |
|---|---|---|
| 55-114931 | 9/1981 | Japan . |
| 62-47623 | 3/1987 | Japan . |
| 63-13018 | 1/1988 | Japan . |
| 2033602 | 5/1980 | United Kingdom . |

OTHER PUBLICATIONS

Berbaum, Kevin S., et al., Essex Corporation "Plan for evaluation of the training potential of helmet–mounted display and computer–generated synthetic imagery"; Apr. 29, 1985.

*Primary Examiner*—Mark R. Powell
*Attorney, Agent, or Firm*—Renner, Otto, Boisselle & Sklar

[57] ABSTRACT

A display system includes a relatively higher resolution display for presenting visual information, and a relatively lower resolution display for presenting visual information, the displays being positioned to present the visual information images therefrom in substantially side-by-side relation, the lower resolution image being provided by the cooperation of focusing optics which form a real image at a retro-reflector, which reflects light along an optical path conjugate with light incident thereon to provide an image for viewing, and the higher resolution image being provided without passing through the focusing optics. A method of display includes forming a relatively lower resolution real image, reflecting the image to the eye of an observer, forming a relatively higher resolution image, and directing the relatively higher resolution image to the eye of the observer such that at least a portion of the relatively lower resolution image circumscribes at least a portion of the relatively higher resolution image.

24 Claims, 5 Drawing Sheets

OPTICAL SYSTEM FOR A HEAD MOUNTED DISPLAY COMBINING HIGH AND LOW RESOLUTION IMAGES

This application is a continuation-in-part of commonly owned U.S. patent application Ser. No. 08/295,383, filed Aug. 24, 1994 now U.S. Pat. No. 5,621,572, the entire disclosure of which hereby is incorporated by reference.

TECHNICAL FIELD

The present invention relates generally, as is indicated, to optical displays, and, more particularly, to head mounted displays, and, even more particularly, to optical displays in which a relatively low resolution image and a relatively high resolution image are combined.

BACKGROUND

Various types of head mounted displays are known. An exemplary head mounted display (throughout the following specification the initials "HMD" may be used to mean "head mounted display") includes optics or optical components such as lenses, mirrors or the like, to direct the image from an image source to an eye or to the respective eyes of a person viewing the image (viewer). The image source develops and/or provides an image intended to be viewed and may or may not be part of the HMD. Head mounted display systems are used in the field of virtual reality and also in aircraft, for example, as part of a heads-up display system, and in other fields, too.

A challenge in designing a head mounted display system is to provide an image with highest possible visual quality. Prior head mounted display systems have not taken advantage of the difference in resolving power of the human eye.

The human eye is capable of resolving great detail, e.g., a relatively high resolution image, only in a small portion of the field of view. This is a consequence of the fact that one part of the retina, called the fovea, has a higher density of visual receptors than the rest of the retina. Therefore, the remainder of the field of view usually is resolved to a lesser degree than is the field of view impinging or incident on the fovea.

Many prior head mounted display systems use light emitting sources to create an image, such as a cathode ray tube, light emitting diode, etc. Several disadvantages to such light sources and head mounted displays using them are relatively large size, weight, and cumbersome nature. For example, in some virtual reality display systems, counterbalancing weights and support systems are needed to hold or to help to hold the helmet containing the virtual reality image source and optics so that it does not severely weigh down the head, neck, shoulders, etc. of the user.

In some prior display systems a modulator modulates light from a source; the images created are a function of modulation. A liquid crystal cell or liquid crystal display device may be such a modulator. A disadvantage of such modulating systems is the reduction in light output due to light blocking and/or absorption occurring in the modulator. To overcome such reduction in brightness, sometimes the intensity of the light source is increased, which draws additional energy, creates heat, requires a larger light source, etc.

Another disadvantage to prior head mounted display systems is the complexity of the components and of the arrangement of the components to provide the desired display or image output. Complexity, size, and so forth usually increase the cost for such systems and reduce the robustness of the system.

The resolution of an optical display system usually is determined by the number of pixels or pixel elements per unit area of the display or per unit area viewed by a viewer of the display. Sometimes such numbers are referred to as the pixel count, and sometimes the pixel count is the number of pixels in the entire display. Various types of displays for producing an image of visual information for viewing are known. The visual information may be an image of an object that is static or dynamic, a moving or dynamic image such as a motion picture information in the form of alphanumeric characters (regardless of the language), etc.

Viewing in accordance with the invention typically refers to as viewing of an image by the human eye or by a pair of human eyes of a person. However, it will be appreciated that features of the invention may be employed when viewing is by another device, such as a still camera, motion picture camera, video camera, charged coupled device, etc.

In many displays circuitry is used to develop electrical signals for delivery to respective pixels to cause the respective pixels to produce a particular light output or to reflect light in a particular way. By operating the respective pixels in a desired way, respective images can be formed, as is known. Moreover, signals usually have to be provided to each pixel to cause the desired optical result thereby. The larger the pixel count (or pixel density), the more complex is the circuitry requirement for the display. For example, the larger number of pixels, the larger will be the number of electrical lines, etc., required to provide electrical signals to the pixels. Also, as the number of pixels increases, the driving circuitry becomes increasingly complex, and, additionally, the scan rate or refresh rate may decrease. Decreasing the scan rate or refresh rate of the pixels may decrease the resolution of the display. Decreasing the number of pixels, of course, also usually reduces the resolution of the display.

It would be desirable to reduce the pixel count, number of lines for driving the pixels, and/or the complexity of the drive circuitry and/or to minimize the scan rate while providing an image that has relatively high resolution characteristics resolvable by the viewer.

It is desirable that a display, especially an HMD, have adequate eye relief and comfort with which images provided by the HMD can be viewed. One aspect of comfort is the distance at which the image is viewed; a comfortable viewing distance is about twenty inches or more, for example, approximate reading distance. An aspect of eye relief is the distance between the eye and the last optical element (such as the output objective of the display) closest to the eye; often it is desirable that such distance be relatively large to provide adequate eye relief. If adequate eye relief is not provided, and/or if the viewing distance at which the image is seen is less than about twenty inches, then the eye may be strained to view the image, which may be uncomfortable and usually is undesirable.

It would be desirable to provide a relatively uncomplicated, small and robust display system, especially for a HMD.

It also would be desirable to provide a high quality image, e.g., bright, of good contrast, and of good resolution, for viewing using a HMD, and especially to derive the image to take advantage of the difference in resolving power of the human eye.

Further, it would be desirable to obtain a relatively wide field of view in an optical display system, especially a head mounted one, and efficiently to deliver light produced by the light source to the viewer. Efficient delivery of light reduces the brightness requirement of the light source, energy requirements and output heat, while providing good brightness, resolution and contrast of the viewed image.

A problem encountered in prior display systems has been the seam which occurs at the junction between two images derived from two different image sources, for example. One example of this problem was manifest in the Cinerama type movie projection system wherein several projectors were used to project images at different locations on a wide area screen. Often a seam existed between the two images. In an HMD such seams can be more visible and more annoying because of the small distances involved and the relatively higher resolution of the images that must be presented to the eye compared to those projected on a distant movie screen. Accordingly, it would be desirable to minimize seams in an HMD or the like.

Additionally, it would be desirable to provide adequate eye relief in a head mounted optical display system.

In the field of computerized drawings and/or graphics, such as engineering drawing, it is customary, now, to display on a monitor an entire image, such as an engineering drawing. The draftsman can view the image and can select that part of the image which it is desired to magnify for better viewing or for modification on a better scale. Various windowing types of programs, computer aided drafting or design programs are available for conventional computers to carry out these tasks.

SUMMARY

According to one aspect of the invention a display system, includes a relatively higher resolution display for presenting visual information, and a relatively lower resolution display for presenting visual information, the displays being positioned to present the visual information images therefrom in substantially side-by-side relation.

According to another aspect, a display system, includes a relatively higher resolution display for presenting visual information, and a relatively lower resolution display for presenting visual information, the displays being positioned to present the visual information images therefrom in substantially side-by-side relation, and wherein the lower resolution visual information image is at least substantially adjacent to and/or may surround the higher resolution visual information image.

According to another aspect, a display system includes a relatively higher resolution display for presenting visual information, and a relatively lower resolution display for presenting visual information, the displays being positioned to present the visual information images therefrom in substantially side-by-side relation, and wherein each of the displays has plural pixels operative to display the visual information, and wherein the relatively higher resolution display has a larger number of pixels per unit area than the relatively lower resolution display.

According to another aspect, a display system, includes a relatively higher resolution display for presenting visual information, and a relatively lower resolution display for presenting visual information, the displays being positioned to present the visual information images therefrom in substantially side-by-side relation, and wherein each of the displays has plural pixels operative to display the visual information, and wherein the relatively higher resolution display has a larger number of pixels per unit area than the relatively lower resolution display, and a circuit drives the pixels to form images for visual viewing.

According to another aspect, a display system, includes a first display, including a retro-reflector, means for focusing an image toward the retro-reflector, and beamsplitter means for reflecting and transmitting light relative to the retro-reflector, whereby the beamsplitter means one of transmits light and reflects light toward the retro-reflector for focusing at or relative to the retro-reflector and the other of transmits light and reflects light from the retro-reflector for viewing, and a second display including means for presenting a relatively higher resolution image than the image presented by the first display, the display including means for presenting the relatively higher resolution image within the image presented by the first display.

According to another aspect a method of display includes forming a relatively lower resolution real image, reflecting the image to the eye of an observer, forming a relatively higher resolution image, and directing the relatively higher resolution image to the eye of the observer such that at least a portion of the relatively lower resolution image circumscribes at least a portion of the relatively higher resolution image.

According to another aspect an optical system for presenting for viewing relatively lower and relatively higher resolution images of visual information includes a retro-reflector, means for focusing a real image of visual information toward the retro-reflector, light from the retro-reflector being reflected to a viewing location as the relatively lower resolution image, and means for forming a relatively higher resolution image for viewing from the viewing location within the relatively lower resolution image.

According to another aspect, a system for viewing at a viewing location an image from an image source includes a retro-reflector, means for focusing an image from a viewing source toward the retro-reflector, and beamsplitter means for reflecting and transmitting light relative to the retro-reflector, whereby the beamsplitter means one of transmits light and reflects light toward the retro-reflector for focusing at the retro-reflector and the other of transmits light and reflects light from the retro-reflector for viewing, and wherein the retro-reflector has non-coplanar portions which are positioned to reflect light to the viewing location for seamlessly combining images resulting from light reflected therefrom.

According to one aspect of the invention, a head mounted display system includes a retro-reflector, and optical means for directing light from an image source to the retro-reflector, light reflected by the retro-reflector being provided for viewing. The image source may be included as part of the HMD.

Briefly, according to the invention, light from an image source is directed by focusing optics to a conjugate optics path along which the light is directed to the eye or eyes of a viewer for viewing of an image.

In an embodiment of the invention the conjugate optics path is provided by one retro-reflector or more than one retro-reflector which at least substantially maintains the characteristics of the light incident thereon, including the results of the focusing by the focusing optics, while reflecting the light to the eye(s) of the viewer. In an embodiment of the invention a beamsplitter directs incident light from the focusing optics into the conjugate optics path, e.g., reflecting light or transmitting light with respect to the retro-reflector and to the eye(s) for viewing.

Also, light directed to the retro-reflector from the focusing optics mentioned above is reflected such that the light continues to have essentially or substantially the same direction it had when it impinged on the retro-reflector so that optically the lens of the eye can appear to be in effect at the focusing optics and the retina of the eye can appear to be in effect at the source of the image.

Another aspect is to direct light having image characteristics from a retro-reflector to a viewer to provide the viewer an image that is focused at a distance that is relatively easily focused by the viewer's eye without focusing at infinity.

According to another aspect, a display system includes means for forming an image for viewing by an eye of an observer, delivery means for delivering the image from the means for forming to the eye of the observer, and the means for forming and the delivery means being cooperative to provide the image to the eye of the observer at a size at the retina of the eye that is approximately the size of the retina.

According to a further aspect, a head mounted display is relatively compact, light weight, robust and able to provide relatively bright images at a viewing distance from a viewer's eye that provides comfortable eye relief.

According to another aspect, an image can be effectively spread out and viewed as an engineering drawing would, for example; a portion of the image can be selected for high resolution display, e.g., as with a mouse or the like associated with a computer, and the selected portion then can be displayed in relatively high resolution while other portions are displayed in relatively low resolution. This technique may be used in the field of computer aided design and the like.

One or more of these and other aspects, objects, features and advantages of the present invention are accomplished using the invention described and claimed below.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

DESCRIPTION

Figure 1:
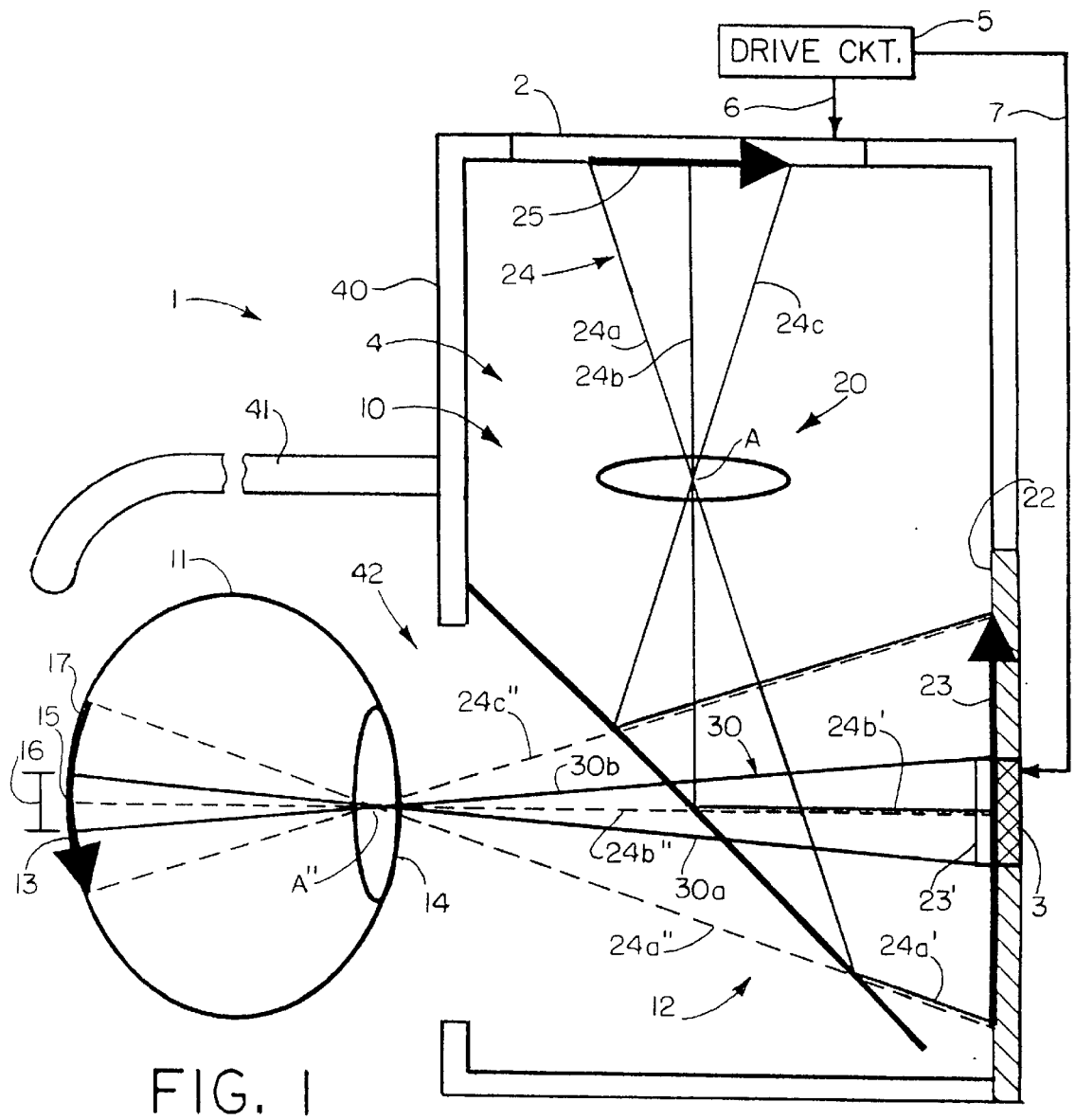
FIG. 1 is a schematic illustration of a head mounted display optical system utilizing a retro-reflector and wherein relatively high and relatively low resolution images are combined.

Referring in detail the drawings, wherein like reference numerals designate like parts in the several figures, and initially to FIG. 1, a display system in accordance with the present invention for viewing images of visual information is shown at 1. The display system 1 includes a pair of image sources 2, 3 and an optical viewing system 4 which in a sense is analogous to an eyepiece or objective with which the respective images produced by the image sources 2, 3 can be viewed. The display system 1 also may include a drive circuit 5 which provides electrical signals or other types of signals to one or both of the image sources 2, 3 via connections 6, 7 to cause the image sources to display visual information for viewing.

The optical viewing system 4 includes an optical system 10 for presenting to the eye 11 of a viewer, such as a person, a relatively low resolution image derived from the image source 2. The optical viewing system 4 also includes a further optical system 12 for presenting to the eye 11 a relatively high resolution image derived from the image source 3.

The eye 11 schematically shown in FIG. 1 includes a retina 13 at the back of the eye and an entrance pupil and lens 14 at the front of the eye. The lens 14 focuses light onto the retina 13 to form images there which are seen by the person. The foveal portion (or fovea) 15 of the retina is marked by the horizontal line 16 at the back of the eye to show the size thereof is smaller than the overall size of the retina 13. The fovea 15 is able to provide greater resolution of images incident thereon than can the other portions 17 of the retina 13.

The display system 1 provides to the eye 11 a relatively lower resolution image via the optical system 10 and a relatively higher resolution image via the further optical system 12. The relatively higher resolution image is intended to be focused by the lens 14 of the eye 11 onto the fovea 15, and the relatively lower resolution image is intended to be focused by the lens 14 onto the other portion 17 of the retina 13.

The optical system 10 of the optical viewing system 4 includes focusing optics 20, a beamsplitter 21, and a retro-reflector 22. The focusing optics 20 is shown as a single lens which is intended to direct light via the beamsplitter 21 toward the retro-reflector 22 and forms a real image 23. The real image may be formed and focused at the retro-reflector 22 or it may be behind or in front of the retro-reflector. The optical system 20 may include a plurality of lenses, mirrors, filters, and/or other means used to form the real image as described. The source of image light provided to the focusing optics 20 is the image source 2.

The image source 2 may be a miniature image source of the type disclosed in copending U.S. patent application Ser. No. 08/275,907, filed Jul. 5, 1994, issued on May 21, 1996 as U.S. Pat. No. 5,519,524, the entire disclosure of which is hereby is incorporated by reference. Such an image source is an active matrix liquid crystal display device which uses as one of the substrates thereof a single crystal silicon (or other semiconductor material) material. Other types of active matrix liquid crystal display devices can be used as the image source 2. Other types of display devices, such as those which emit light, those which modulate light, e.g., which is intended to be transmitted or reflected by the display, electroluminescent devices, cathode ray tube devices, liquid crystal devices, etc., may be used to present light 24 representing an image 25 as an input to the focusing optics 20.

The beamsplitter 21 may be a conventional beamsplitter which reflects approximately 50% of the light incident thereon and transmits approximately 50% of the light incident thereon. If desired, other reflection/transmission ratios may be used. To avoid double images, it may be desirable to provide an anti-reflecting coating or the like on one or both of the surfaces of the beamsplitter 21. The beamsplitter 21 also may be other types of beamsplitters, such as one which reflects plane polarized light which is polarized (e.g., has a transmission axis) in one plane (e.g., electric vector is in that plane) and transmits plane polarized light which is polarized in the orthogonal direction. Furthermore, the beamsplitter 21 may be a device which reflects circular polarized light having one direction of circular polarization and transmits circular polarized light having the opposite direction of circular polarization. Quarter waveplates and/or other devices may be used to cooperate with the beamsplitter 21 and the light incident thereon to obtain the desired beamsplitter function of reflecting and/or transmitting light.

Various types of retro-reflectors 22 may be used in the invention. One example is that known as a corner reflector or a sheet having a plurality of corner reflectors. An example of such a retro-reflector film or sheet material having a plurality of corner cubes is sold by Reflexite Corporation of New Britain, Conn. Such material is available, for example, having about 47,000 corner reflectors per square inch. Another retro-reflector material useful in the invention is a material having plural glass beads or other refracting and/or reflecting devices on or in a support, such as a flexible sheet, a rigid sheet, glass, etc.

In FIG. 1 solid lines represent the light 24 incident on the retro-reflector 22. Light rays 24a, 24b, and 24c are shown for example. It will be appreciated that other light rays also may be traced through the optical system to form the real image 23 at or relative to the retro-reflector 22. From the beamsplitter 21 to the retro-reflector 22 such light rays are designated 24a', 24b' and 24c', for example. Dotted lines from the retro-reflector 22 designated 24a", 24b" and 24c" depict light rays reflected by the retro-reflector to and through the beamsplitter 21 to the entrance pupil and lens 14 of the eye 11. The paths of the light rays 24a', 24a" are conjugate and opposite in direction, and the paths 24c' and 24c" also are conjugate and opposite.

Since the above-mentioned light paths are conjugate to and from the retro-reflector 22 and since the focusing optics 20 forms a real image 23, e.g., the image 25 is located beyond the focal point of the focusing optics 20, the entrance pupil and lens 14 of the eye 11 can be placed relative to the light incident thereon from the retro-reflector 22 via the beamsplitter 21 such that the entrance pupil and lens become effectively or optically in the same relative position to the image 25 as the focusing optics 20 is to the image 25.

For example, as is seen in the diagram of several light rays presented in FIG. 1, the extremities of the image 25 represented by light rays 24a, 24c pass through and intersect at the center point A of the focusing optics 20, and correspondingly the light rays 24a" and 24c" pass through and intersect at the center point A" of the lens 14 of the eye 11. Similar relationship would occur with respect to other rays, such as those depicted in FIG. 3, which is described below and also in the parent application identified above.

In the optical viewing system 4 of the display system 1, the further optical system 12 provides a relatively high resolution image for viewing by the eye 11. The resolution of the image presented by the further optical system 12 preferably is higher or greater than the resolution of the image 23 presented by the optical system 10. This can be accomplished even using the same type of displays, such as transmissive liquid crystal displays, for the image sources 2, 3. For example, the image produced by the image source 2 may be magnified by the focusing optics 20 to form the real image 23. Such magnification reduces resolution; for example, the number of pixels per inch (or some other unit area) at the image 23 is less than the number of pixels per same unit area at the image source 2. However, the image produced by the image source 3 may be viewed without magnification by the focusing optics. Therefore, the number of pixels per unit area, e.g., resolution, is greater than that of the real image 23. However, the size of the image produced by the image source 3 is coordinated with the size of the real image 23 so that the two blend as one image (register, etc.), which has a relatively low resolution except where the image source 3 is located and viewed, and that portion is in relatively high resolution. If desired, the resolution of the image sources 2, 3 may be different.

The further optical system 12 includes the image source 3 and the light path 30 to the entrance pupil and lens 14 of the eye 11. The light path 30 passes through the beamsplitter 21. The image 23' presented by the image source 3 preferably is formed in the same plane as the real image 23 is formed. Therefore, the light rays 30a, 30b representing two of the light rays representing the image 23' also pass through the center A" of the lens 14 and, in particular, are focused onto the fovea 15.

The further optical system 12 includes the image source 3 and the light path 30 through the beamsplitter 21 to the eye 11. The light path 30 through the beamsplitter 21 may be reduced in intensity by approximately 50% due to the transmission and reflection characteristics of the beamsplitter 21, the extra light that is reflected by this beamsplitter 21 being sent up relative to the illustration in FIG. 1 toward the focusing optics 20 and image source 2 where such light may be lost or may be used additionally to brighten the image 25. Alternatively, the beamsplitter 21 may be of the type which transmits all of the light incident thereon in the light path 30, for example, due to the nature of the optical polarization of such light. Further, if desired, the beamsplitter 21 may have an opening therethrough to pass light in the light path 30 without attenuation; such opening being of a size to pass light in the light path 30 where it intersects the beamsplitter 21, but generally minimizing such opening so that the beamsplitter is effective to reflect the light 24 in the manner described above.

Preferably the real image 23 and the image 23' are formed in the same plane or substantially the same plane so that both are focused on the retina 13. However, the higher resolution image 23' from the image source 3 primarily is focused on the fovea 15, and the real image 23 primarily is focused on the other portion 17 of the retina 13. Thus, the higher resolution image is presented to the fovea which has better resolving or higher resolving capability than the other portion 17 of the retina 13. Therefore, the display system 1 cooperates with the image resolving capability of the eye 11.

In the description herein reference to low resolution image, lower resolution image, and relatively low or relatively lower resolution image mean the same thing; and reference to high, relatively high, relatively higher, etc. resolution image also means the same thing. In the description there are two portions of the image presented to the eye 11, one portion being of relatively lower resolution compared to the resolution of the other portion the higher resolution portion.

The high resolution image 23' from the image source 3 is shown being transmitted directly to the eye 11. However, the high resolution image 25 is presented by viewing by the eye as the real image 23 by light reflected from the retro-reflector 22. The image 23 may lose resolution relative to the resolution of the image 25 as a function of the resolving capability, such as the number of reflectors per unit area, of the retro-reflector 22.

In the display system 1, if the high resolution image source 3 has a larger number of pixels per unit area than the low resolution image source 2 money, complexity, etc. can be saved and reliability can be increased, as will be appreciated. Alternatively, the number of pixels per unit area may be the same in the two image sources; or the number can be greater in the low resolution image source since it is magnified, but the image source still would provide relatively high resolution image effect since its image is not magnified by the focusing optics.

The drive circuit 5 may be, for example, conventional video circuitry used to receive television signals or circuitry used to receive signals from a computer intended to drive a visual display. The drive circuit 5 may be a conventional drive circuit of a drive currently used in various computers, such as notebook computers which drive active matrix liquid crystal displays, such as circuits used to drive CRT monitors, etc. The drive circuit 5 is coupled by the connection 6, such as a plurality of electrical leads or the like, to the image source 2 to develop the low resolution image 25, and the drive circuit 5 is connected by the connection 7, such as a number of other leads, to the high resolution image source 3 to develop the relatively high resolution image 23'. If the number of pixels per unit area of one image source is larger than that of the other image source, the number of leads or connections in the connection 7 per unit area may differ per image source.

In the embodiment of display system 1 illustrated in FIG. 1 the high resolution image source 3 is embedded in and/or made substantially integral and coplanar with the retro-reflector 22 to present the high resolution image 23' and the low resolution image 23 in relatively coplanar relation; and in such case the real image 23 is formed at the retro-reflector 22. Alternatively, if desired, the high resolution image 23' and the low image resolution 23 may be in different planes. Moreover, if desired, the high resolution image source may be located at a place other than the retro-reflector 22, for example, being located in front or behind the retro-reflector relative to the illustration of FIG. 1, e.g., to the left or right relative to the illustration.

As was mentioned above, the image sources 2, 3 may be active matrix liquid crystal display devices of the type disclosed in the above-mentioned copending U.S. patent application. However, either or both of the image sources 2, 3 may be other sources of image, light, visual information, etc. for use in the display system 1. For example, one or both of the images 25, 23' may be derived from an image source that is relatively remotely located to the display system 1, and the respective image may be conveyed to the display system 1 via light transmission through the air, through other optical media, such as fiber optics, through other optical components, such as lenses, etc. The image sources hereof may be high resolution liquid crystal displays having a size on the order of one square inch or less, each. An exemplary image source is one proposed by SONY Corporation in a paper presented at the Society for Information Display, International Display Research Conference, Oct. 10–13, 1994, Monterey, Calif., entitled "A 1.35-in.-diagonal Wide-Aspect-Ratio poly-Si TFT LCD with 513 k Pixels", at pages 414–417 of the conference record.

In an example of the invention, each of the image sources 2, 3 is the same type, namely a light modulating transmissive liquid crystal display. Since brightness of the light from the display 2 is attenuated in the optical path which includes the focusing optics and beam splitter, for example, and possibly due to light reduction at the retro-reflector (and possibly even reduction in intensity due to magnification), it is desirable to balance the intensities of the light output from the light sources 2, 3. Such balancing may include changing intensity, e.g., cutting down intensity of the image source 3, so that the intensity of the light forming the image 23' at the output of the image source 3 at the retro-reflector 22, for example, and the intensity of the light forming the image 23 as reflected by the retro-reflector will be the same or about the same. For special effects, it may be desired to alter the balance of light intensities.

Compared the light reflecting capability of the image source 3, the retro-reflector 22 is a much more efficient light reflecting medium. For example, in response to the incident light 24 which forms the real image 23, the retro-reflector 22 may be approximately three hundred times more reflective than the image source 3. Therefore, the light from the image source 2 which is incident on the image source 3 makes a relatively negligible contribution to the image as viewed by the eye 11.

However, if it is desired to eliminate a portion of the light 24 from being incident on the image source 3, it is possible to provide a blanking of the image source 2. Therefore, where such image source 2 would coordinate with the image source 3, the image source 2 would not emit (transmit, output, etc.) light. Such blanking can be performed by conventional software or by some other technique, as will be appreciated by those having ordinary skill in the art.

The display system 1 also preferably includes a housing 40 and a mounting structure 41, such as a temple piece like that used in an eye glass frame, a strap, or other means to mount the display system 1 on the head or other body part of a person so that the eye(s) 11 can view the visual information output therefrom at the exit port or opening 42 of that housing 40. The system 1 can be mounted in another device. The display system 1 shown in FIG. 1 presents an image to one eye 11 of a human observer, for example. The various components shown in FIG. 1 may be duplicated and/or some may be shared to present an image to the other eye of the person. In this way, if desired, true binocular images can be formed and presented for viewing. The images may be stereoscopic in which depth is provided by respective left eye and right eye images to give the sense of depth and distance. Alternatively, the images may be essentially monoscopic so as to present the images for both eyes without any substantial depth.

Various conventional means may be used to mount the components of the optical viewing system 4 in the housing 40 to obtain the relative positioning shown in FIG. 1. Additional optical components may be included in the optical viewing system 4, such as linear polarizers, circular polarizers, waveplates, focusing elements, such as lenses or mirrors, prisms, filters, shutters, apertures, diaphragms, and/or other components that may be used to provide a particular type of output image for viewing. Also, the housing 40 may be entirely closed other than for a source of input light and the output port 42 for viewing light/images. However, if desired, the housing may be partly or substantially open whereby simply a frame is used to support the various components in relative position.

Although the image source 2 is shown directing the image 25 into the optical system 10 from the top, it also will be appreciated that the image source can be located at the bottom of the device to direct the image up from the bottom. In this case the direction of the beamsplitter 21 would be reversed so that light from the image source 2 is reflected to the retro-reflector 22 from the image source and then from the retro-reflector to the eye 11 of the viewer. (If two retro-reflectors are used, such as in the embodiment of FIG. 7, then there also would be a retro-reflector at the top.)

Figure 2:
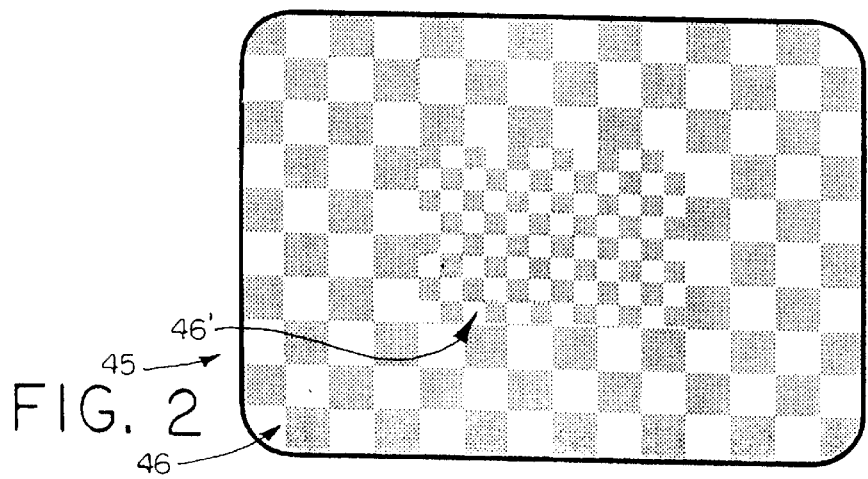
FIG. 2 is a schematic illustration of the relatively high and relatively low images presented in the field of view by the system of FIG. 1.

In FIG. 2 an example of an image 45 produced by the display system 1 and seen by the eye 11 is shown. The image 45 includes a low resolution portion 46 and a relatively high resolution portion 46', which correspond, respectively, to the images 23, 23' in FIG. 1. The high resolution image portion 46' is generally essentially located in the image 45, for example, in the approximate center (or elsewhere, if desired) and the relatively low resolution portion 46 circumscribes or surrounds the high resolution portion. Therefore, preferably the high resolution image is seen by the fovea 15, and the low resolution image is seen by the rest of the retina 13.

Therefore, a viewer can look at the center of the image 45 and see the high resolution image portion 46' with the high resolving portion of the eye and the low resolution image portion 46 with the low resolution resolving portion of the eye. This is acceptable display procedure since it is unnecessary to present a high resolution image to that portion of the eye which is not capable of high resolution resolving. The fact that a high resolution is not required over the entire field of view greatly reduces the total pixel count and the rate at which data must be input to the display system 1, such as the image sources 2, 3.

The images 46, 46' may be presented in side-by-side relation. Also, the low resolution image can be adjacent to or partly or fully surround the high resolution image.

In using the invention a relatively lower resolution real image is formed, and that image is reflected to the eye of an observer (viewer). Additionally, a relatively higher resolution image is formed, and it, too, is directed to the eye of the observe. Preferably, at least a portion of the relatively lower resolution image is adjacent (or even surrounds) a portion or all of the high resolution image, and more preferably, the two images are presented at effectively a seamless junction. Moreover, according to a method of the invention, the relatively high resolution image is presented to the fovea of an eye of an observer, and the lower resolution image is presented to a portion of the retina that does not have the high resolving capability of the fovea.

In making the invention a low resolution image presenting optical system and a relatively high resolution image presenting optical system are combined such that the two images are presented to the eye of an observer and the high resolution image is presented to the fovea or other relatively high resolving portion of the eye or other optical device viewing the image, and the relatively low resolution image is presented to a lower resolving portion of the eye or other optical device receiving or viewing the image. Thus, the display system 1 made in accordance with the invention can be made to fit the viewing characteristics of human vision. That is, the optical viewing system 4 of the invention is able to present the central portion of an image at a higher resolution than the remainder of a field of view intended to be observed by the eye of an observer. The viewer can see a composite image including a high resolution image in the center, for example, that is seamlessly joined to a lower resolution image filling the rest of the field of view.

The relative positioning of the parts of the display system 1 and the other characteristics of those parts, such as, for example, the magnifying power and focal length of the focusing optics 20 can be selected to obtain the desired magnification or not of the low resolution image 23 relative to the size of the image 25. Preferably the image source 2 is beyond the focal distance or focal point of the focusing optics (lens) 20 so the image 23 is a real image.

For some magnification situations, as is described further in detail below, it is desirable to use a relatively short focal length focusing optics 20 such that the focal length thereof is less than that of the lens 14 of the eye 11 to the back of the eye. Also, to provide a relatively large or wide "sweet spot" or place where the eye 11 can be positioned relative to the optical system 4 and/or the output port 42, while still being able to see a good quality (bright, good resolution, and/or good contrast, etc.) image preferably also with a relatively wide field of view, it is desirable to use a relatively short focal length lens or focusing optics 20, and even more preferably to use such a focusing optics 20, indeed, optical viewing system 4 overall, which has a relatively low f#.

Figure 3:
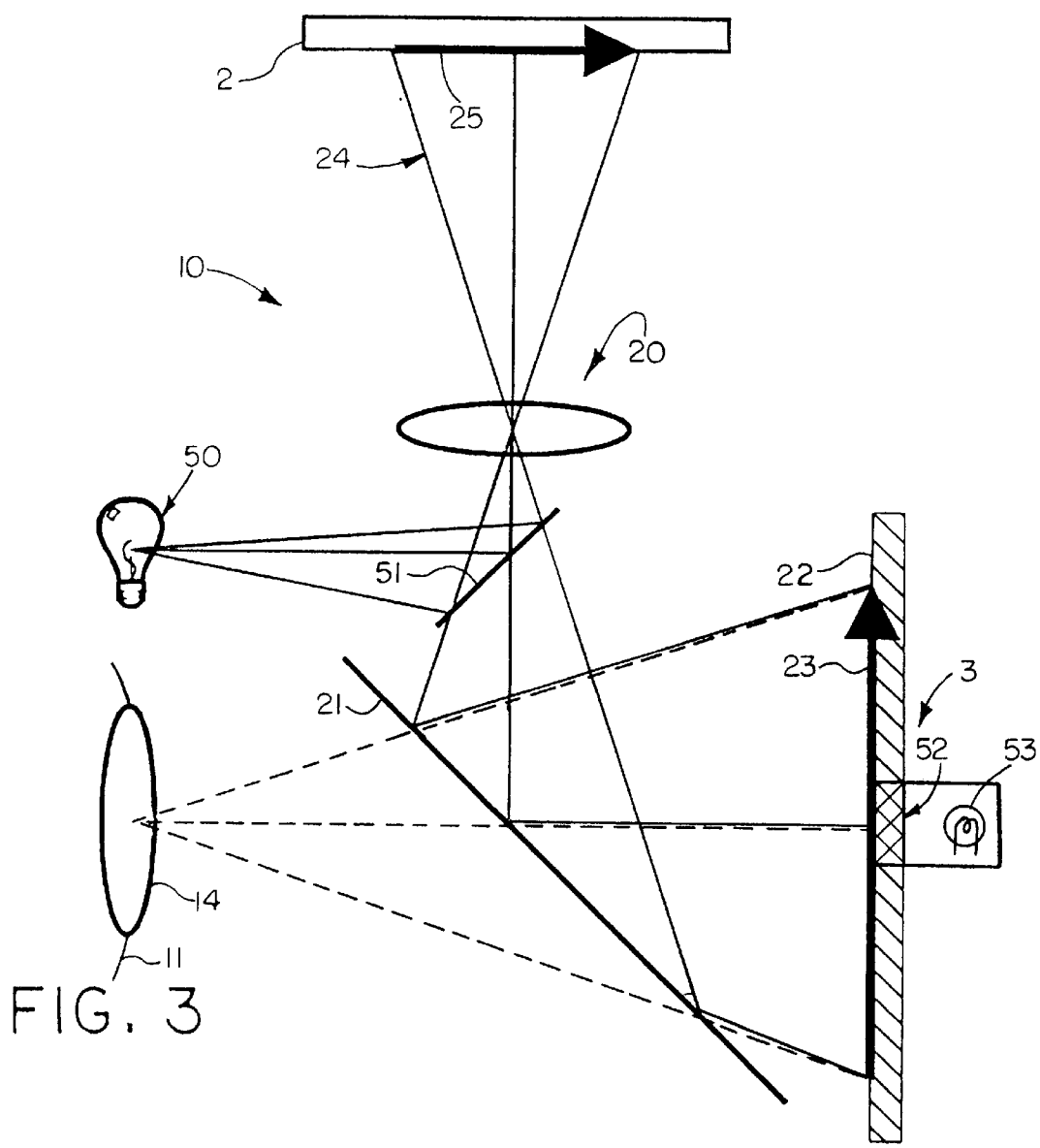
FIG. 3 is schematic illustration of an HMD optical system according to the invention showing a light path for illuminating the low resolution image source.

In FIG. 3 is shown an example of a technique for bringing light from a light source 50 to the low resolution image source 2. Specifically, a beamsplitter 51 is placed in position to direct light from the light source 50 to the image source 2. The image source 2 reflects light to form the image 25 which is focused by the focusing optics 20 to form a real image 23 as was described above. The light 24 reflected by the image source 2 is transmitted through the beamsplitter 51 to the beamsplitter 21 from which it is reflected to the retro-reflector 22. Other techniques also may be used to illuminate the image source 2. An example is disclosed in copending U.S. patent application Ser. No. 08/187,262, filed Jan. 25, 1994, the entire disclosure of which hereby is incorporated by reference.

Alternatively, the image source 2 may be a light emitting display, such as a cathode ray tube or electro luminescent display device. As another alternative, the image source 2 may be a light modulating device, such as a liquid crystal display, which modulates light transmitted therethrough, and in this case the source of the light provided to the image source 2 may be on the side of the image source remote from the focusing optics 20.

According to the invention in which there are two display systems 1, one for each eye, for example, the light source 50 (or other light source) may be shared by two or more of the image sources, such as the low resolution image sources 2 for the respective eyes. The light source also may be used to provide light to illuminate the high resolution display 3 in one or both optical viewing systems 4 (one for each eye). The high resolution image source 3 may be reflective, transmissive, or light emitting, as was described above with respect to the image source 2. Preferably the image source 3 is a light transmissive LCD 52 and a light source 53, as is exemplified in FIG. 3.

Figure 4:
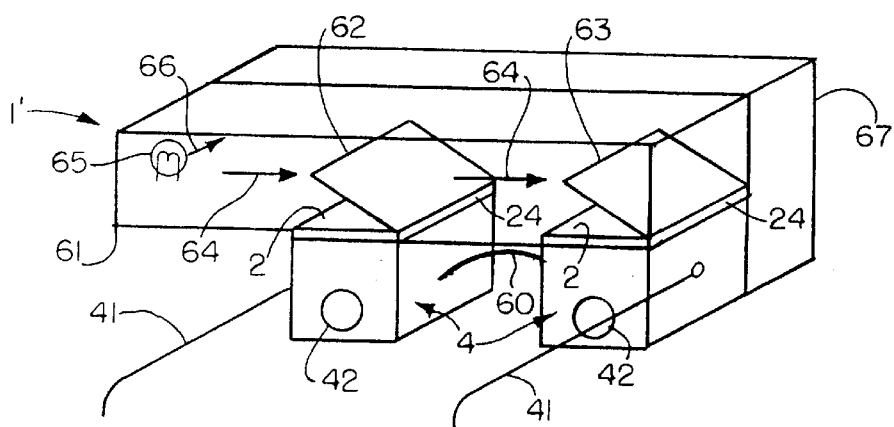
FIGS. 4 and 5 are schematic illustrations of HMD optical systems according to the invention using, respectively, transmissive or reflective low resolution image sources and a shared light source for two display devices for the respective eyes of a viewer.

Briefly turning to FIG. 4, an example of a head mounted display system 1' in accordance with the invention is shown. The display system 1' includes two display systems 1 which are mounted together by a support structure 60, such as a nose bridge piece similar to that used on an eyeglass frame, and/or other support structure in the form of housing 61. The HMD system 1' includes two optical viewing systems 4 like the one described above with respect to FIG. 1. The high resolution image sources 2 are transmissive. A beamsplitter 62 and reflector 63 direct light 64, from the light source 65 to the respective image sources 2 to form the low resolution images. Light 66 from the light source 65 also is directed by reflectors, beamsplitters, and/or the like to a back compartment 67 of the system 1' provide a source of illumination to one or both of the high resolution image sources 3 of the optical viewing systems 4. For example, the light 66 may travel toward the back compartment 67 and be reflected in that compartment by one or more reflectors, beamsplitters and/or the like to the back (relative to the viewing ports 42), of the system 1' to be directed as incident light on respective high resolution image sources 3. The high resolution image sources modulate light transmitted therethrough to form the respective high resolution images.

In using the system 1' illustrated in FIG. 4, the system may be mounted on the head of a person using the nose bridge piece 60 and the temple pieces 41 for support on the head and/or other means to provide appropriate positioning of the output ports 42 relative to the eyes of the user. Alternatively, the system 1' can be positioned in a relatively fixed location, and the eyes may be brought to the output ports 42. The low and high resolution images are formed for the respective eyes, deriving from light 64 or 66 from the light source 65, and the images can be viewed by the respective eyes.

The embodiments illustrated in FIGS. 3 and 4 are examples of techniques for providing light to image sources that are not light emitting. Other techniques also may be used to provide light to the image sources. As was mentioned above, took one or more of the image sources may be light emitting.

Figure 5:
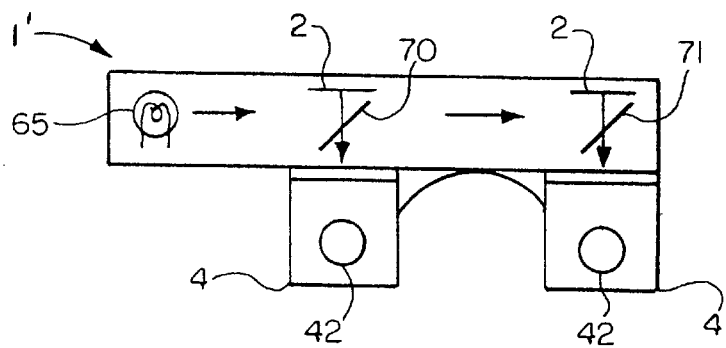

As another alternative, which is shown schematically in FIG. 5, light from the source 65 is provided to two reflective low resolution image sources 2 of respective optical viewing systems 4 via beamsplitters 70, 71. The images formed by the low image resolution sources 2 can be viewed through the respective output ports 42 by respective eyes.

The human eye is most comfortable when viewing an image at a distance of about twenty inches, approximately at the distance at which one would place a book, document, etc. to be read. It is desirable that the final image as seen by the viewer be located at such distance, e.g., approximately twenty inches from the pupil 14 of the eye. This can be accomplished in the manner illustrated in FIG. 6.

Figure 6:
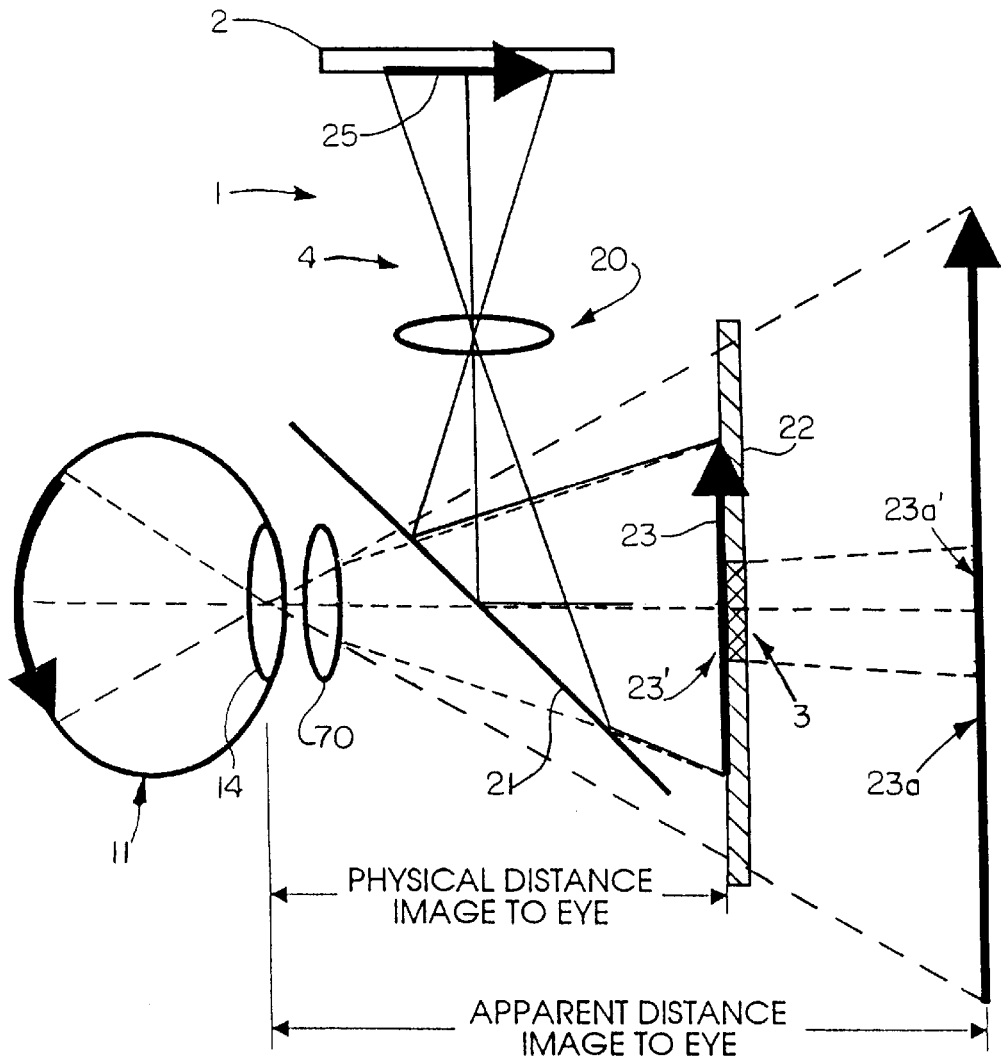
FIG. 6 is a schematic illustration of a modified optical system using an additional lens component to obtain comfortable viewing distance while reducing the size of the system.

The HMD system 1 can be compact and still provide comfortable viewing distance of about twenty inches as is illustrated in FIG. 6 by adding an additional optical system 20a between the beamsplitter 21 and the entrance pupil and lens 14 of the eye 11. In FIG. 6 such optical system 20a is depicted as a single lens; however, it will be appreciated that it may include other optical components as was mentioned above, for example, with respect to the focusing optics 20. In the HMD system 1 of FIG. 6 the viewer is provided with a virtual image 23a of the image source 2 image 25 or of real image 23 at the desired viewing distance (twenty inches, for example) by the cooperation between the focusing optics, retro-reflector, and additional optical system 20a. A virtual image 23a' due to viewing the image 23' through the optical system 20a may be at the location (e.g., in the same plane) of the virtual image 23a from the low resolution image source 2 by locating the high resolution image source 3 at the plane of the real image 23, e.g., in the plane of the retro-reflector 22. Other means also may be used to locate the high resolution image in the desired viewing plane.

It will be evident that the beamsplitter 21 and retro-reflector 22 cooperate to provide the conjugate optics path described herein. It will be appreciated that the beamsplitter 21 may be positioned relative to the focusing optics 20 to reflect light to the retro-reflector 22 and to transmit to the eye 11 light which has been reflected by the retro-reflector. Alternatively, it will be appreciated that the beamsplitter and retro-reflector may be so positioned that the beamsplitter transmits light to the retro-reflector and reflects to the eye 11 light which has been reflected by the retro-reflector.

It will be appreciated that the various features and embodiments illustrated in the several figures hereof may be used in the other embodiments and/or systems illustrated in the various other figures. For example, the additional optics 20a used in the system of FIG. 6 may be used in other embodiments disclosed and illustrated herein. The drive circuit 5 only is illustrated with respect to FIG. 1, but it will be appreciated that such drive circuit may be used in connection with the other embodiments disclosed herein. Other examples of features useful in the various embodiments herein are the several techniques used (and equivalent techniques) for providing light to the image sources.

Figure 7:
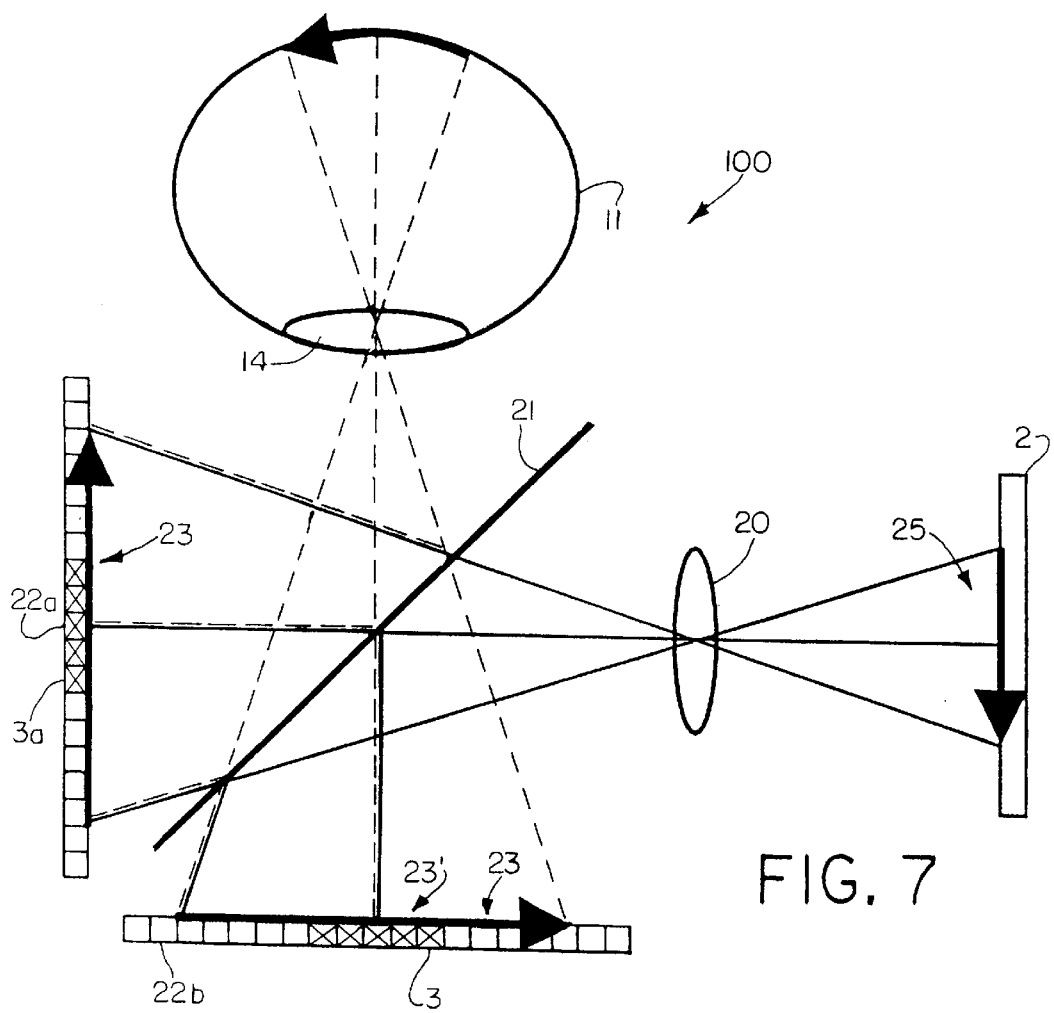
FIG. 7 is a schematic illustration of another embodiment of HMD using plural retro-reflectors, respectively, positioned relative to the beamsplitter.

FIG. 7 illustrates another embodiment of HMD system 100, features of which can be used with the several embodiments described above. In particular, an additional retro-reflector 22a is added at an orientation and location relative to the beamsplitter 21 and the original retro-reflector 22 such that the additional retro-reflector reflects some light from the image source that previously was lost to the optical system 10. Specifically, light from the focusing optics 20 and image source 2 is reflected by the beamsplitter 21 to the retro-reflector 22, and the retro-reflector 22 reflects light to the beamsplitter for transmission to the eye 11. Additionally, light from the focusing optics 20 which is transmitted through the beamsplitter 21 to the additional retro-reflector 22a is reflected by the additional retro-reflector 22a back to the beamsplitter 21 for reflection to the eye 11. Although some light from the retro-reflector 22 may be reflected by the beamsplitter back to the image source 2 and some light from the additional retro-reflector 22' may be transmitted through the beamsplitter to the image source 2, such light is not necessarily lost to the optical system 10 of the HMD system 100. Rather, such light may be used to increase the brightness of the light incident on the image source 2 when such source is a reflective one, and, thus, further increase the brightness of the image viewed by the eye 11.

It will be appreciated that the HMD 100 increases the amount of light to the viewer, and, thus, increases the brightness of the output image while minimizing the illumination requirements of the optical system 10.

In the display 100 of FIG. 7 there may be one or two high resolution image sources 3, 3a. If only one is used, then to avoid the light from the other retro-reflector in which that image source is not embedded or positioned near, the technique of blanking the image source 2 at areas which would correspond to the location of the high resolution image source may be used to prevent washing out of the high resolution image by light reflected from such other retro-reflector. Also, blanking could be used in those instances when it is desired to have both high and low resolution images produced as described. However, if desired, the blanking could be terminated and the high resolution image source could be turned off. In such case, the other retro-reflector would fill in the image where the image source 3, for example, is located, thereby to provide a full low resolution image in the full field of view in cooperation with the retro-reflector in which the high resolution image source is mounted or positioned. This improved versatility and flexibility of the display 100.

If two high resolution image sources were used, e.g., 3 and 3a, as is illustrated in FIG. 7, they could both be positioned so as to be viewed simultaneously and in registration (i.e., aligned to merge) to increase the brightness of each. In such case blanking would not be needed for the reasons described above. However, if desired, blanking could be used. Also, it may be desired to use alternately, e.g., sequentially or otherwise, the respective high resolution image sources 3, 3a to provide different respective images for a desired optical effect, thus increasing the flexibility of the invention.

Figures 8, 10:
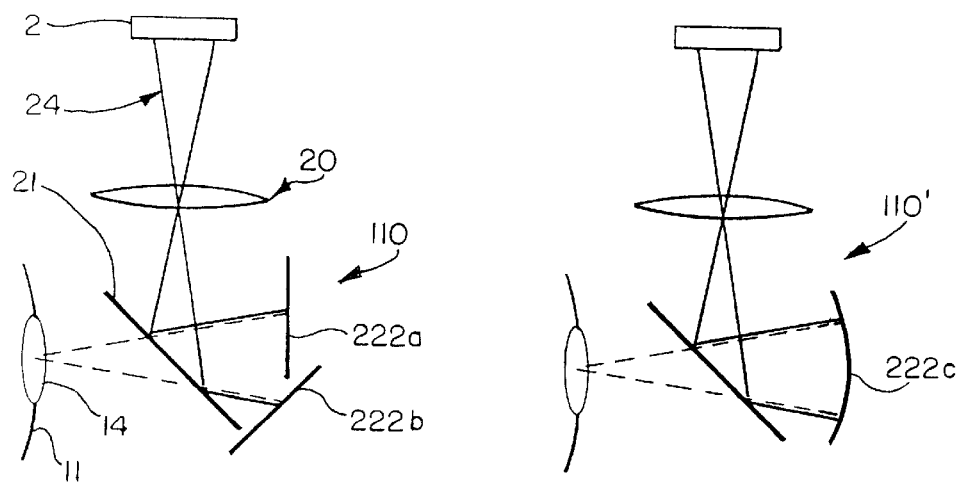
FIG. 8 is a schematic illustration of exemplary positioning of two non-coplanar portions of a retro-reflector for use as a retro-reflector in the various embodiments of the invention.
FIG. 10 is a schematic illustration of another arrangement of curved retro-reflector in accordance with the present invention.

In some instances it is possible that the retro-reflector may not be perfectly flat, that it in fact is curved, or that it is not sufficiently large for the HMD system 110. It has been found that the orientation of the retro-reflector 22 in the optical systems of the several embodiments described and illustrated may be other than flat and/or may be in multiple parts. Moreover, the parts need not be perfectly flat or parallel; rather the several parts can be in different orientations, provided the orientations are sufficient to provide the desired retro-reflection function described herein. An example of such non-parallel or linear orientation of a retro-reflector 22a, 22b is illustrated in FIG. 8. An HMD system 110 using such multiple part retro-reflector 23a, 23b, without regard to whether the retro-reflector is flat or the parts thereof are parallel, has been found to be functional in the manner described above to provide images for viewing by the eye 13.

Figure 9:
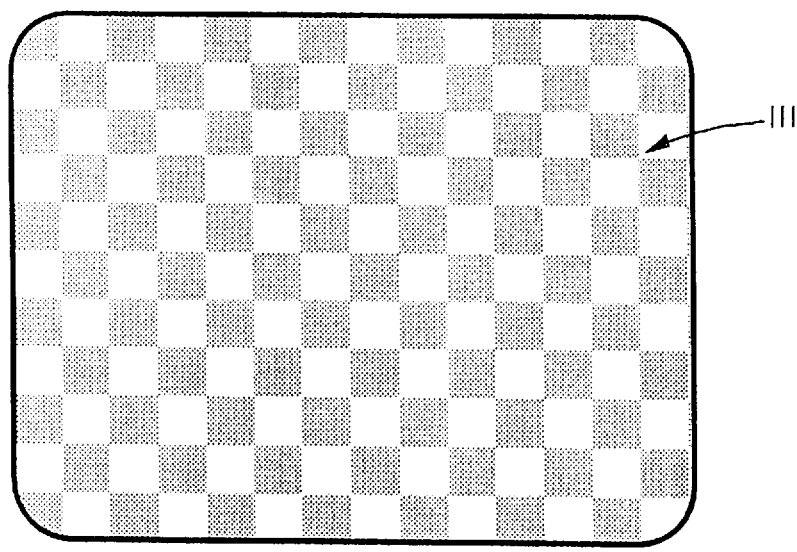
FIG. 9 is a schematic illustration of a seamless image produced by an optical system in accordance with the invention using two retro-reflector portions positioned in non-coplanar relation, such as that of FIG. 8.

FIG. 9 is a schematic illustration of the image seen by the HMD system 110 of FIG. 8. The image 111 only includes the image formed by the image source 2. It is seen as a checkerboard and there are no seams where the two retro-reflectors 222a, 222b overlap or intersect. Therefore, the checkerboard produced as the image output from the image source 2 appears to the eye 11 as a uniform checkerboard without any discontinuities due to overlapping of the retro-reflectors. Although not shown in FIG. 8 or in the image of FIG. 9, there may be a further image source, such as a high resolution image source 3, located to provide in the plane of the real image formed by the focusing optics 20. The high resolution image then can be viewed with the low resolution image in the manner described above.

Briefly referring to FIG. 10, a system 110' which is similar to the system 110 described above with respect to FIG. 8 is shown. In the system 110' the retro-reflector is shown at 222c as a curved retro-reflector. Operation of the system 110' is the same that described above with respect to FIG. 8.

The invention may be used in connection with engineering design or computer aided drawing, graphics, design, etc. In the field of computerized drawings and/or graphics, such as engineering drawing, it is customary, now, to display on a monitor an entire image, such as an engineering drawing. The draftsman can view the image and can select that part of the image which it is desired to magnify for better viewing or for modification on a better scale. Various windowing types of programs, computer aided drafting or design programs are available for conventional computers to carry out these tasks.

The present invention may present to a viewer a full engineering drawing or some other drawing. Such drawing may be presented by a computer which has an engineering drawing software and a drawing file. It may be desired to view a portion of the drawing in high resolution so as to correct, to improve, to add to, etc. the drawing. A mouse or some other device may be used to point to or to locate a portion of the drawing which is to be displayed in high resolution. After such portion has been selected, the computer can direct the image from that portion for display by the high resolution display 3, for example. This operation is similar to the technique used to "blow up" a design on a CRT or other monitor, using various drawing computer programs. However, in the present invention, rather than magnifying the selected portion of the design, the selected portion simply is shown in relatively high resolution. If desired, the portion also can be magnified and displayed using both high and low resolution as was described above. Thus, the invention relates to a method as described for computer aided designing, etc., wherein a total design or drawing is viewed as a relatively low resolution image, and a portion of the image is "windowed", selected, or the like and is displayed as a relatively high resolution image.

The display of the invention provides high resolution imaging and a presentation to the viewer in some instances analogous to the presentation in a movie theater. The features of the high resolution image and wide field of view enable the device to be used, for example, to view movies or the like with a movie theater-like presentation.

The embodiments of the invention claimed are, as follows:

1. A display system comprising a viewing location from which an image with a high resolution portion and a low resolution portion is viewed;

a field of view in which the image is formed;

a high resolution image source for presenting the high resolution portion of the image at the field of view;

a low resolution image source for presenting the low resolution portion of the image at the field of view;

a reflective surface in the field of view;

one of the image sources forming its respective portion of the image on the reflective surface in the field of view whereby its reflection will be viewed at the viewed location;

the other of the image sources forming its respective portion of the image substantially in the same plane as the reflective surface, and wherein the high resolution image source forms its portion of the image in the same plane as the field of view and wherein the low resolution image source forms its portion of the real image on the reflective surface in the field of view.

2. The system of claim 1, wherein said high resolution image source, said low resolution image source, and said reflective surface in the field of view present the portions of the image one within the other.

3. The system of claim 2, wherein the the low resolution portion of the image at least substantially surrounds the high resolution portion of the image.

4. The system of claim 1, wherein each of the image sources has plural pixels operative to display the respective portion of the image, and wherein the high resolution image source has a larger number of pixels per unit area than the low resolution image source.

5. The system of claim 4, further comprising circuit means for driving said pixels to form said image.

6. The system of claim 1, wherein said low resolution portion of the image comprises a real image and wherein said system further comprises:

lens means positioned optically between the low resolution image source and the reflective surface in the field of view for focusing the real image from the low resolution image source on the reflective surface, and conjugate optics means for receiving light from the lens means and directing light toward the field of view, said conjugate optics means including means for effectively placing the directed light functionally as though at said lens means, whereby the real image from the low resolution image source effectively is at the image plane of the lens means.

7. The system of claim 6, wherein said high resolution image source is positioned to present the high resolution portion of the image in a path parallel to at least part of the conjugate optics path.

8. The system of claim 1, further comprising focusing optics, and a beamsplitter, and wherein said reflective surface is a retroreflector, said focusing optics focusing light from said low resolution image source toward said retroreflector via said beamsplitter to form the low resolution portion of the image.

9. The system of claim 8, wherein said high resolution image source presents the high resolution portion of the image in at least a portion of the low resolution portion of the image.

10. The system of claim 8, wherein said focusing optics are operative to form a real image from light received from said low resolution image source.

11. The system of claim 1, wherein at least one of said image sources comprises an active matrix liquid crystal display.

12. The system of claim 1, wherein each of said image sources comprises a reflective active matrix liquid crystal display.

13. The system of claim 12, wherein each of said active matrix liquid crystal displays is formed on a respective semiconductor substrate.

14. A display system as set forth in claim 1, further comprising a second high resolution image source for presenting the high resolution portion.

15. A display system as set forth in claim 14 further comprising a second reflective surface surrounding the second high resolution image source and wherein the reflective surfaces are positioned non-coplanar relative to each other.

16. A display system as set forth in claim 14 wherein the reflective surfaces are positioned substantially perpendicular to each other.

17. A display system comprising a relatively higher resolution display for presenting a high resolution visual information image, a relatively lower resolution display for presenting a low resolution visual information image, a high resolution image source, a low resolution image source, focusing optics, a retroreflector, and a beamsplitter, said displays being positioned to present the visual information images therefrom in substantially side-by-side relation, said focusing optics focusing light from said low resolution image source toward said retroreflector via said beamsplitter to form the low resolution visual information;

said focusing optics being operative to form a real image from light received from said low resolution image source;

said high resolution image source located in said retroreflector thereby to present the relatively higher resolution visual information image for viewing while being surrounded by the real image.

18. The system of claim 7, said retroreflector comprising at least two retroreflectors.

19. The system of claim 18, wherein at least one of said retroreflectors is non-planar.

20. The system of claim 19, wherein at least one of said retroreflectors is curved.

21. The system of claim 18, wherein said retroreflectors have the same resolution.

22. A display system comprising:

a viewing location;

a first display, including a retroreflector, means for focusing an image toward said retroreflector, and a pair of beamsplitter means for reflecting and transmitting light relative to said retroreflector, whereby one of said beamsplitter means transmits light and reflects light toward said retroreflector for focusing at said retroreflector and the other of said beamsplitter means transmits light and reflects light from said retroreflector for viewing at the viewing location, and a second display including means for presenting a relatively higher resolution image than the image presented by said first display, and means for presenting the relatively higher resolution image within the image presented by said first display;

wherein said means for presenting of said second display is positioned at least substantially at said retroreflector.

23. The system of claim 22, wherein said means for focusing comprises means for forming a real image from light received from an image source.

24. A display system as set forth in claim 1, further comprising a focusing optical device and conjugate optical device, wherein the focusing optical device focuses the low resolution portion at the conjugate optical device and the conjugate optical device directs the focused low resolution portion to the reflective surface in the field of view.

* * * * *